---

UNITED STATES PATENT OFFICE.

HARRY H. CULMER, OF JOLIET, ILLINOIS.

DYE AND PROCESS OF PRODUCING DYES.

1,409,083.

Specification of Letters Patent. Patented Mar. 7, 1922.

No Drawing. Application filed September 29, 1917. Serial No. 193,994.

*To all whom it may concern:*

Be it known that I, HARRY H. CULMER, a citizen of the United States, residing at Joliet, Illinois, have invented a certain new and useful Improvement in Dyes and Processes of Producing Dyes, of which the following is a full, clear, and exact description, such as will enable others skilled in the art to which it appertains to make and use the same.

This invention relates to the manufacture of dyes.

One object of my invention is to provide a new dye or dye substance.

Another object is to provide a rapid and inexpensive process for producing dyes and dye substances.

Another object is to provide a dye or dye substance that can be used with equally good results on wood, fibrous substances and fabrics of wool, cotton, silk and linen.

And still another object is to provide an inexpensive dye oil that can be applied to the substance or material to be dyed, and said substance or material thereafter treated with a suitable acid or chemical so as to develop or fix the dye material contained in the dye oil. Other objects and desirable features of my invention will be hereinafter pointed out.

My new dye or dye substance is formed from bituminous substances. It is produced preferably by subjecting a bituminous substance of the character hereinafter referred to to a distilling operation, then condensing the evolved vapors so as to produce a dye oil, and thereafter treating the dye oil in any known or suitable way, so as to precipitate, concentrate, recover or fix the dye substance in the dye oil. The dye oil can either be used to impregnate the material to be dyed and said material thereafter treated with a suitable acid or chemical so as to develop or fix the dye substance in the oil, or the dye oil can be treated with a suitable chemical or acid so as to precipitate the dye substance in same, and said precipitate thereafter combined with one of the many solvents or carriers that are generally used in the manufacture of dyes.

The bituminous materials that I have found to be suitable for producing dyes and dye substances are the hydrocarbon mineral gilsonite, bituminous mineral shales, commonly called "curly shales" which abound in the mountains of Utah, Colorado and other districts, natural asphalts and compounds which are of an asphaltic nature, asphaltic sandstone and other natural bitumens, artificially prepared bitumens produced from petroleum by destructive distillation, sludge acid residues of a bituminous nature other than those obtained from the distillation of coal in the process of making gas and coke and the minerals grahamite, bituminite, elaterite and wurtsilite. I do not wish it to be understood, however, that my invention is limited to the particular bituminous materials above mentioned, as my broad idea consists in treating bituminous substances that contain dye oils, so as to extract the oil therefrom, thus obtaining a dye oil, and subsequently treating the dye oil in any known or suitable way, so as to recover, concentrate or fix the dye substance in the oil. Therefore, I have used the expression "bituminous materials containing dye bearing oils" in the claims to mean bituminous substances and materials containing dye oil, which, when subjected to heat in a retort or distilling apparatus, will give forth the dye bearing oils therein, and which oils, by subsequent refinement or treatment, can be converted into dyes of various shades and colors. Dyes or dye substances produced by my process can be used with equally good results on wood, wood pulp, wood silk, straw and grass and fabrics formed of wool, silk, linen, cotton, ramie, jute fibre and artificial silk produced from wood.

In producing dyes and dye substances according to my invention I first subject a quantity of bituminous material of the character previously referred to, or a bituminous material having similar characteristics, to a distilling operation in a retort, and thereafter condense the evolved vapors in a condenser of any suitable type. Any suitable type of retort may be used, but I prefer to use a retort of the vertical type on account of the fact that the heat can be applied to the upper end of the retort first, thus preventing foaming and accidental discharge of the untreated liquid bitumen in the retort. In producing dyes from the hydrocarbon mineral known as gilsonite which has a melting point of approximately 330° F., I place about one ton of the mineral in the retort and then apply heat to the retort gradually, so as to distil the oil contained in the gilsonite, the heat being gradually lowered upon the sides of the retort towards the bottom of same as the process continues. After all of the oil has been distilled from the gilsonite there will be left in the retort a residual carbon deposit of approximately 35% of the original quantity of gilsonite, which carbon deposit can be used in the manufacture of paints and carbon black. The temperature during the distilling operation is gradually raised to approximately 950° F., but the particular temperature that is used in practicing my process is immaterial, so far as my invention is concerned, as I have practiced my process successfully with heats up to 1800° F., with, however, undue loss in the evolved gases. Furthermore, when a high temperature, such, for example, as 1800° F. is employed, the coke deposit that is left in the retort is not as suitable for the manufacture of paints and carbon black as the deposit obtained when a lower temperature is used in the distilling operation. The distilling operation can be carried on under atmospheric pressure or under a vacuum. I have also produced dye substances by my improved process under pressure up to 300 pounds to the square inch. In producing dyes and dye substances from gilsonite I have found that the amount of oil obtained when a temperature of approximately 950° F. is used in the distilling operation is usually about 60% of the mass of gilsonite originally put into the still. This dye oil is non-viscous and has a high flash point compared to ordinary petroleum and differs from petroleum and also from coal tar oil, in that it can be redistilled water white and light lemon color. Upon standing such oil will turn red, purple and dark brown in the different fractions and will deposit a dye upon the walls of the container.

The dye material in the dye oil can be separated, concentrated or recovered in any well known or suitable way, such, for example, as by treating the dye oil with suitable acids, chemicals, metallic salts or other salts, so as to precipitate the dye substance in the oil, and thereafter redissolving the dye substance freed from acid in all or part of its original oil in solvents or carriers that are generally used in the manufacture of dyes. If desired, the dye oil can be oxidized by subjecting it to the action of ozone, ozonized air or an ozonized gaseous mixture during the operation of acidulating the dye oil, as I have found that such treatment produces dyes of different shades and colors than those obtained when the dye oil is subjected to an acidulating operation with no ozone present. As previously described, instead of acidulating the dye oil so as to produce a precipitate that can be combined with a solvent or conveyor such as those generally used in the manufacture of dyes, my new dye oil can be used to impregnate or saturate the substance or material to be dyed, and said substance or material thereafter treated with a suitable chemical or acid so as to fix or develop the dye within the material or substance. This is a very desirable feature of my improved dye or dye substance, as it enables certain of the cheaper or common kinds of woods to be treated with the dye oil and thereafter treated with suitable acids or chemicals, thus producing beautiful shades and colors similar to those found in mahogany, walnut, purple logwoods, etc. Paper made from wood pulp can be dyed with my dye oil either in the sheet or by coloring the pulp during the manufacture of the paper, the dye in the oil being of such a character that the color will remain in the paper during the subsequent pressing and drying operation.

One convenient way of testing for colors is to acidulate the dye oil with hydrochloric or acetic acid and pour the warm dilute acid mixture upon damp sawdust, producing the color of the dye, the color or shade varying from light, medium to dark, according to the dilution of the acid mixture.

Having thus described my invention, what I claim, and desire to secure by Letters Patent, is:—

1. A new dye material produced by extracting oils from a hydrocarbon material or bituminous substance by distillation, acidulating the oil by treating the same with an acid to dissolve out the dye material from said oil, afterwards concentrating the dye material in the acid solution, redissolving the dye material in a solvent, and reconcentrating the same.

2. A new dye or dye substance produced by extracting oil from bituminous materials containing dye bearing oils, and thereafter treating said oil with an acid so as to recover, concentrate or fix the dye substance in the oil.

3. A new dye or dye substance produced by subjecting a bituminous material containing dye bearing oils to heat in a distilling apparatus, condensing the evolved vapors, and thereafter treating the resultant oil with an acid in such a manner as to recover, concentrate or fix the dye substance in the oil.

4. A new dye or dye substance formed by precipitating, by acid treatment, the dye material contained in oil extracted from bitumen containing dye bearing oils, then concentrating said dye material, and thereafter combining said dye material with a solvent.

5. The process of making a new dye or dye substances from bitumens containing dye bearing oils, consisting in extracting dye bearing oil from bitumen, fractionating said oil and precipitating the dye substance in the different fractions by acidulating the oil, separating the dye substance so formed, and thereafter dissolving the dye in a solvent so as to recover, concentrate and fix by treatment with chemicals the dye substance obtained from the bitumens.

6. A new dye or dye substance formed by acidulating a dye oil obtained by the distillation of a bituminous material containing dye bearing oils.

7. A new dye consisting of a solvent or carrier mixed with a precipitate obtained by treating dye oil distilled from a bituminous material containing dye bearing oils, with an acid.

8. A process for producing dyes and dye substances, characterized by subjecting bituminous material containing dye bearing oils to a distilling operation, and thereafter condensing the evolved vapors and subsequently acidulating the condensate and precipitating the dye contained therein.

9. A process for producing dyes and dye substances, characterized by subjecting a bituminous material containing dye bearing oils to a distilling operation, thereafter condensing the evolved vapors, and treating the resultant oil with an acid so as to recover, concentrate or fix the dye material contained in same.

10. A process for producing dyes and dye substances, characterized by extracting oil from a bituminous material containing dye bearing oils, precipitating the dye material in the oil by acidulating with an acid, and subsequently combining the precipitate with a solvent or carrier.

11. A process for producing dyes and dye substances, characterized by producing dye oil from a bituminous material containing dye bearing oils, and thereafter acidulating said oil to precipitate the dye material in the oil.

12. A new dye or dye substance formed by acidulating a dye oil extracted from bituminous substances, treating such acidulated oil so as to precipitate the dye substance in the oil, and thereafter dissolving the dye substance in a solvent and concentrating the dye substance from said solvent so as to recover the dye from the bituminous material treated.

13. A new dye consisting of a solvent or carrier mixed with a precipitate obtained by treating with an acid the dye oil extracted by heating bitumens that contain dye bearing oils.

14. A process for producing dyes and dye substances characterized by distilling the hydrocarbon bitumen contained in curly shale, condensing the evolved vapors and acidulating the condensed dye oil subsequent to its impregnation or saturation into the object or substance to be dyed.

15. A new dye consisting of a solvent or carrier mixed with a precipitate obtained by extracting oil from a bituminous material containing dye bearing oils, and thereafter subjecting the oil to the action of a chemical that will precipitate the dye substance in the oil.

16. A process for producing dyes and dye substances, characterized by subjecting asphaltic bitumens to destructive distillation, precipitating them by acidulation to separate the contained dye materials, subsequently separating the dye materials from the oils and acid, and redissolving said dye material in a solvent or carrier.

17. A process for producing dyes and dye substances, characterized by subjecting the natural bitumens to distillation in a retort under a vacuum so as to obtain therefrom dye carrying oils or oily bodies, and thereafter recovering the dye materials from said oils or oily bodies.

18. A process for producing dyes or dye substances, characterized by distilling oil from bituminous materials containing dye bearing oils, and thereafter acidulating the oil with acid and subjecting it to the action of ozone for the purpose of recovering the dye substance contained in the oil.

19. A process for producing dyes and dye substances, characterized by distilling the hydrocarbon bitumen contained in natural bitumens, condensing the evolved vapors, acidulating the condensed dye oil subsequent to its impregnation or saturation into the object to be dyed.

20. A process for producing dyes and dye substances, characterized by subjecting the natural bitumens to distillation in a retort under a vacuum so as to obtain therefrom dye carrying oils or oily bodies and thereafter recovering the dye materials from said oils or oily bodies.

21. A process of producing dyes or dye substances, characterized by distilling oil from bituminous materials containing dye bearing oils, acidulating the oil with acid for recovering the dye substance contained in the oil and simultaneously subjecting the dye oil to the action of ozone for imparting different shades and colors to the resulting dye.

HARRY H. CULMER.